United States Patent Office 2,901,318
Patented Aug. 25, 1959

2,901,318

POTASSIUM MONOPERSULFATE HYDRATE AND ITS PRODUCTION

Alfred A. D'Addieco, Grand Island, N.Y., assignor to E. I. du Pont de Nemours and Company, Wilmington, Del., a corporation of Delaware No Drawing. Application October 31, 1957
Serial No. 693,522

1 Claim. (Cl. 23—114)

This invention relates to potassium monopersulfate and particularly to a new hydrate thereof.

Potassium monopersulfate, $KHSO_5$, has recently been found to be an outstanding bleaching agent for various purposes, particularly for use in home laundry bleaching compositions and in scouring powders. Pure or relatively pure anhydrous potassium monopersulfate is quite stable, but since it is highly hygroscopic, its commercial preparation and use have not heretofore been regarded as attractive. The present invention relates to a hydrate of potassium monopersulfate which is both stable and nonhygroscopic under usual atmospheric conditions and, therefore, well suited for commercial use as a bleaching agent and for other purposes.

It is, therefore, an object of the invention to provide a hydrate of potassium monopersulfate, particularly potassium monopersulfate monohydrate, which is nonhydroscopic. A further object is to provide ways of preparing such a hydrate. Still further objects will be apparent from the following description.

The objects of the invention are realized by the production of potassium monopersulfate monohydrate, $KHSO_5 \cdot H_2O$, particularly by recrystallizing potassium monopersulfate from aqueous solutions. This monohydrate, like its parent non-hydrated monopersulfate, is quite stable as regards its active oxygen content and is useful for bleaching and other purposes. However, in contrast to the non-hydrated monopersulfate, the monohydrate is not hygroscopic under usual atmospheric conditions and is, therefore much better suited for commercial use.

Potassium monopersulfate monohydrate crystallizes as large colorless platelets. The crystals become white and opaque upon drying, e.g., in a vacuum, but still retain their crystal shape. The monohydrate is stable as regards its active oxygen content. A sample showed no active oxygen loss during storage for 2 weeks at room temperature and at a relative humidity of 80%. Another sample showed no loss in active oxygen after storage for 3 months in a vented bottle at room temperature and relative humidity. The compound softens between 40 and 45° C.

The monohydrate of the invention can be prepared by crystallizing potassium monopersulfate from aqueous solutions thereof. Crystallization should be carried out under conditions favoring crystal growth, e.g., using solutions not too highly supersaturated so that crystallization occurs relatively slowly. If precipitation is effected rapidly from a highly supersaturated solution or by the rapid reaction of a concentrated monopersulfuric acid solution with a concentrated potassium carbonate solution with simultaneous rapid precipitation of product, the monopersulfate usually precipitates in finely divided non-hydrated form. The latter yields a hygroscopic product which readily picks up moisture from the atmosphere to the point of being very moist. In contrast, if the product is precipitated slowly, the crystalline monohydrate is formed. This will not pick up moisture from the atmosphere except at very high relative humidities, e.g., about 85% or higher.

The invention is illustrated by the following examples:

Example 1

A monopersulfuric acid solution containing 61.6% $H_2SO_5$, 3.51% $H_2O_2$ and about 20% $H_2SO_4$ by weight was reacted in the cold with an amount of a 50% potassium carbonate solution to provide one equivalent of $K^+$ per mole of $H_2SO_5$. The resulting slurry was filtered and the filter cake was sucked as dry as possible. The cake was slurried with cold ethanol and the mixture filtered to provide a second filter cake. Slurrying with alcohol and filtering were repeated and the final filtered product was dried in a vacuum desiccator, after which it contained 8.98% active oxygen.

The above product was dissolved at room temperature in 1 to 1.5 times its weight of water and ethanol was added to the resulting solution until it became turbid. The mixture was then cooled until crystallization occurred. After standing at room temperature a few minutes, the mixture was filtered and the separated crystals were analyzed and found to contain 3.29% active oxygen.

Using the filtrate from the above operation and repeating the addition of ethanol to turbidity, cooling and filtering, yielded a second fraction of crystals containing 5.91% active oxygen. Repeating these operations on the resulting filtrate gave a third fraction of crystals containing 8.22% active oxygen. Another repetition using the last filtrate gave a fourth fraction of crystals (platelets) containing 9.41% active oxygen by weight. Still another repetition using the last filtrate gave a fifth fraction of crystal (platelets) analyzing 9.47% active oxygen.

It will be observed that the active oxygen contents of the fourth and fifth crystal fractions were substantially the same and correspond to the theoretical value of 9.41% for $KHSO_5 \cdot H_2O$.

Example 2

A sample of finely divided anhydrous potassium monopersulfate containing 9.3% active oxygen was prepared by rapidly reacting at low temperature concentrated monopersulfuric acid and potassium carbonate solutions in proportions corresponding to 1 mole of $K^+$ per mole of $H_2SO_5$. The rapidly precipitated product was filtered out and dried under vacuum at room temperature.

A 10 g. sample of the above product was stored in an open beaker at room temperature and at 80% relative humidity for 9 days. The beaker and its contents were weighed initially and at intervals thereafter with the following results:

| Time of Weighing | Weight (g.) |
| --- | --- |
| Initially | 57.6971 |
| After 1 day | 57.9575 |
| After 3 days | 58.4307 |
| After 4 days | 58.7816 |
| After 5 days | 58.8916 |
| After 6 days | 59.0012 |
| After 8 days | 59.0926 |
| After 9 days | 59.1952 |

It will be observed that in the nine days the above sample picked up 1.4981 g. of water or 14.98% of its weight compared with a theoretical value of 11.83% to form the monohydrate. It is also evident that the moisture pickup would have been still greater had the test been prolonged.

Example 3

A sample of the anhydrous monopersulfate prepared in Example 2 was dissolved at room temperature in about 0.5 part by weight of water per part of monopersulfate and the solution was allowed to stand overnight at 4° C. The crystals obtained in the form of large colorless platelets were separated. After being dried thoroughly between filter papers, they had an active oxygen content of 9.35% (theoretical for monohydrate=9.41%). When the crystals were dehydrated by vacuum drying at room temperature they became opaque, but still retained their crystal shape. The dehydrated crystals contained 10.4% active oxygen (theoretical for $KHSO_5$=10.52%).

*Example 4*

A 4.0619 gram sample of potassium monopersulfate monohydrate crystals when exposed for 9 days in an open beaker at room temperature at 80% relative humidity showed no loss in active oxygen and no gain in weight, hence, no moisture pickup.

X-ray diffraction data show that potassium monopersulfate monohydrate has a crystalline structure distinctly different from that of the non-hydrated monopersulfate precipitated rapidly in finely divided form from supersaturated solution. Some of the more intense $d$ values in the order of decreasing intensity obtained using copper $K_{\alpha-1}$ radiation are given below for these two compounds.

| Non-hydrated $KHSO_5$ | $KHSO_5$ Monohydrate |
|---|---|
| 3.85 | 3.44 |
| 3.05 | 9.1 |
| 3.36 | 3.06 |
| 3.64 | 2.30 |
| 3.23 | 4.59 |

Because it is not hygroscopic except at extraordinarily high relative humidities, the monohydrate of the invention constitutes a distinctly improved form of potassium monopersulfate which can be packaged and handled under usual atmospheric conditions much more satisfactorily than can the corresponding anhydrous compound.

I claim:

Potassium monopersulfate monohydrate.

References Cited in the file of this patent

UNITED STATES PATENTS 2,802,722     Stephanou             Aug. 13, 1957